(12) United States Patent
Lau et al.

(10) Patent No.: US 10,320,796 B2
(45) Date of Patent: *Jun. 11, 2019

(54) SECURING PARTNER-ENABLED WEB SERVICE

(71) Applicant: MICROSOFT TECHNOLOGY LICENSING, LLC, Redmond, WA (US)

(72) Inventors: Eric Wai Ho Lau, Mountain View, CA (US); Zhaowei Charlie Jiang, Palo Alto, CA (US); Ronald H. Jones, Jr., Mountain View, CA (US); Derrick Isaacson, Mountain View, CA (US); Ralph E. Lemke, Sunnyvale, CA (US); Peter Wu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 446 days.

This patent is subject to a terminal disclaimer.

(21) Appl. No.: 14/724,219

(22) Filed: May 28, 2015

(65) Prior Publication Data

US 2015/0365419 A1 Dec. 17, 2015

Related U.S. Application Data

(63) Continuation of application No. 12/948,770, filed on Nov. 18, 2010, now Pat. No. 9,071,616.

(51) Int. Cl.
*G06F 21/34* (2013.01)
*H04L 29/06* (2006.01)
(Continued)

(52) U.S. Cl.
CPC .......... *H04L 63/102* (2013.01); *G06F 21/335* (2013.01); *G06F 21/34* (2013.01);
(Continued)

(58) Field of Classification Search
CPC .. G06F 21/34; G06F 2221/0711; G06F 21/30; G06F 21/31; G06F 21/604;
(Continued)

(56) References Cited

U.S. PATENT DOCUMENTS 6,687,743 B1 2/2004 Innes
6,742,127 B2 5/2004 Fox et al.
(Continued)

FOREIGN PATENT DOCUMENTS

WO 2006070067 A1 7/2006
WO 2006077283 A1 7/2006

OTHER PUBLICATIONS

Kim, Minkyu; "A Survey of Kerberos V and Public-Key Kerberos Security;" Washington University in St. Louis Department of Computer Science & Engineering; no date, 21 pages.
(Continued)

*Primary Examiner* — Shewaye Gelagay
*Assistant Examiner* — Carlton Johnson
(74) *Attorney, Agent, or Firm* — International IP Law Group, PLLC

(57) ABSTRACT

The claimed subject matter provides a method for securing a partner service. The method can include receiving a request, wherein the request comprises a unique value, to access the partner service, wherein the request is received from a browser client for a partner application and determining that a user is authorized to access the partner application, the partner application generating a token that associates the user with the partner application. The method can also include generating a signature for the token, the signature to enable the partner service to independently regenerate the signature, the token comprising an identifier for the partner application enabling the partner service to
(Continued)

detect which partner application generates the token and sending the token with the signature to the browser client.

20 Claims, 4 Drawing Sheets

(51) Int. Cl.
*H04L 29/08* (2006.01)
*G06F 21/33* (2013.01)

(52) U.S. Cl.
CPC ............ *H04L 63/104* (2013.01); *H04L 67/02* (2013.01); *H04L 67/2842* (2013.01); *H04L 63/06* (2013.01)

(58) Field of Classification Search
CPC ......... G06F 2221/2149; G06F 21/6218; H04L 63/08; H04L 63/0428
See application file for complete search history.

(56) References Cited

U.S. PATENT DOCUMENTS

| | | | |
|---|---|---|---|
| 6,795,924 B1 | 9/2004 | Kiessling et al. | |
| 7,103,772 B2 | 9/2006 | Jorgensen et al. | |
| 7,114,076 B2 | 9/2006 | Callaghan | |
| 7,174,383 B1* | 2/2007 | Biswas | H04L 63/083 |
| | | | 709/229 |
| 7,240,212 B2 | 7/2007 | Arnone et al. | |
| 7,409,428 B1 | 8/2008 | Brabec et al. | |
| 7,478,245 B2 | 1/2009 | Allen | |
| 7,650,383 B2* | 1/2010 | Logue | H04L 12/585 |
| | | | 709/206 |
| 7,673,135 B2 | 3/2010 | Chin et al. | |
| 7,818,792 B2 | 10/2010 | Shamsaasef et al. | |
| 7,895,445 B1 | 2/2011 | Albanese et al. | |
| 7,902,247 B2 | 3/2011 | Sinha et al. | |
| 8,024,784 B1 | 9/2011 | Issa | |
| 8,099,764 B2 | 1/2012 | Herzog et al. | |
| 8,200,834 B2 | 6/2012 | Williams | |
| 8,336,089 B1* | 12/2012 | Ahmed | G06F 21/00 |
| | | | 726/5 |
| 8,640,202 B2 | 1/2014 | Roy | |
| 8,775,810 B1* | 7/2014 | Snodgrass | H04L 9/08 |
| | | | 713/175 |
| 8,813,186 B2 | 8/2014 | Hegg et al. | |
| 9,003,491 B2 | 4/2015 | Herzog et al. | |
| 2001/0002914 A1 | 6/2001 | Aramoto | |
| 2002/0031230 A1 | 3/2002 | Sweet et al. | |
| 2002/0197979 A1* | 12/2002 | Vanderveen | H04L 63/0869 |
| | | | 455/410 |
| 2003/0046586 A1 | 3/2003 | Bheemarasetti et al. | |
| 2003/0076808 A1 | 4/2003 | McNiff et al. | |
| 2003/0165121 A1 | 9/2003 | Leung et al. | |
| 2004/0068649 A1 | 4/2004 | Haller et al. | |
| 2004/0122907 A1 | 6/2004 | Chou et al. | |
| 2005/0083929 A1 | 4/2005 | Salo et al. | |
| 2007/0073808 A1 | 3/2007 | Berrey et al. | |
| 2007/0214209 A1 | 9/2007 | Maeda | |
| 2007/0226150 A1* | 9/2007 | Pietrzak | G06Q 30/02 |
| | | | 705/59 |
| 2007/0244818 A1 | 10/2007 | Tsuji et al. | |
| 2007/0260674 A1 | 11/2007 | Shenfield | |
| 2008/0005263 A1 | 1/2008 | Baraev et al. | |
| 2008/0068995 A1 | 3/2008 | Skog | |
| 2008/0189774 A1 | 8/2008 | Ansari et al. | |
| 2008/0271146 A1 | 10/2008 | Rooney et al. | |
| 2008/0293486 A1 | 11/2008 | Newcombe | |
| 2009/0037725 A1 | 2/2009 | Farrugia et al. | |
| 2009/0235349 A1* | 9/2009 | Lai | H04L 9/3213 |
| | | | 726/14 |
| 2009/0248632 A1 | 10/2009 | Subramanian | |
| 2010/0174900 A1 | 7/2010 | Lin | |
| 2010/0223471 A1* | 9/2010 | Fresko | H04L 63/08 |
| | | | 713/176 |
| 2010/0332824 A1 | 10/2010 | Little et al. | |
| 2011/0296036 A1 | 12/2011 | Canning et al. | |
| 2012/0084844 A1* | 4/2012 | Brown | G06F 21/34 |
| | | | 726/6 |

OTHER PUBLICATIONS

De Boer, Martijn; "Single Sign on for Web Services;" SCN Wiki; Oct. 23, 2010; 3 pages.

Aziz et al.; "Privacy and Authentication for Wireless Local Area Networks"—Sun Microsystems, Inc., Jul. 26, 1993, pp. 1-13.

Burnside et al.; "Proxy-Based Security Protocols in Networked Mobile Devices"—ACM copyright 2002, pp. 265-272.

Kwon et al.; "Integrated Transport Layer Security: End-to-End Security Model between WTLS and TLS"—IEEE copyright 2001, 7 pages.

Podner et al., "Mobile Push: Delivering Content to Mobile Users*," European Commission under Contract 1st-1999-10288 (OPELIX), pp. 1-6.

Singhal, et al., "Guide to Secure Web Services", Retrieved at« http://csrc.nist.gov/publications/nistpubs/800-95/SP800-95.pdf »,Aug. 2007, pp. 128.

Angal, et al., "Building Identity-Enabled Web Services", Retrieved at« http://developers.sun.com/identity/reference/techarUid-enabled-ws.html », Oct. 18, 2005, pp. 12.

"SOA Management", Retrieved at« http://www-01.ibm.com/software/tivoli/features/soa/soa-mgmUsecure-web-serv.html »,Retrieved Date: Aug. 13, 2010, pp. 4.

* cited by examiner

200

300

SECURING PARTNER-ENABLED WEB SERVICE

CROSS-REFERENCE TO RELATED APPLICATIONS

This application claims priority to U.S. patent application Ser. No. 12/948,770, filed on Nov. 18, 2010, the contents of which are incorporated by reference as if set forth in their entirety herein for all of these applications.

BACKGROUND

Web services may provide users a secured environment for accessing everyday applications such as email and chat. Generally, authenticated users may access the everyday applications using a web browser client.

In some cases, web services may be partner enabled. A partner enabled web service may securely serve data for a partner application. Because of security concerns, partner applications typically access a partner-enabled web service through server-to-server communication.

Direct access to a partner-enabled web service from a partner application's browser client is insecure. The insecurity arises from the challenge in verifying whether the direct access originates from a specific partner. Because of such insecurities, the partner client applications are typically stand-alone applications instead of web browser clients.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

In one embodiment, a method includes receiving a request, wherein the request comprises a unique value, to access the partner service, wherein the request is received from a browser client for a partner application and determining that a user is authorized to access the partner application, the partner application generating a token that associates the user with the partner application. The method can also include generating a signature for the token, the signature to enable the partner service to independently regenerate the signature, the token comprising an identifier for the partner application enabling the partner service to detect which partner application generates the token, and sending the token with the signature to the browser client.

In another embodiment, a system for securing a partner service, can include a processing unit and a system memory, wherein the system memory comprises code configured to direct the processing unit to receive a request, wherein the request comprises a unique value to access the partner service, wherein the request is received from a browser client for a partner application, wherein the browser client is associated with a user. The code can also be configured to direct the processing unit to determine that the user is authorized to access the partner application and to generate a token, using the partner application, the token associating the user with the partner application, and the token comprising an identifier for the partner application enabling the partner service to identify the partner application as generating the token. Furthermore, the code can be configured to direct the processor to generate a signature for the token, the signature to enable the partner service to independently regenerate the signature and send the token with the signature to the browser client.

In yet another embodiment, one or more computer-readable storage devices, can include code configured to direct a processing unit to receive a request to access a partner service, wherein the request comprises a unique value and the request is received from a browser client for a partner application, wherein the browser client is associated with a user and determine that the user is authorized to access the partner application. The code can also be configured to direct the processing unit to generate a token that associates the user with the partner application, wherein the token comprises an identifier of the partner application enabling the partner service to identify the partner application as generating the token and generate a signature for the token, the signature to enable the partner service to independently regenerate the signature. Furthermore, the code can be configured to direct the processing unit to send the token with the signature to the browser client and encode the token using a one-way hashing algorithm.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
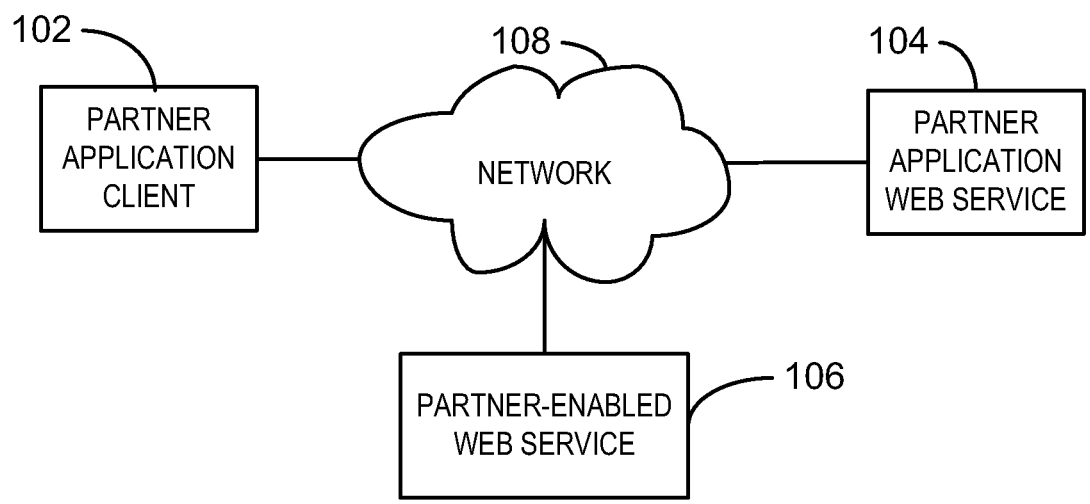
FIG. 1 is a block diagram of a system for securing a partner-enabled web service in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "browser," "web service," "client," "partner application" and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Access to the partner-enabled web service may be restricted to authenticated users and authenticated partner client applications. These partner client applications may run on web browser clients. However, existing options to enable access for an authenticated user of a partner client application running on a browser are limited.

For example, a partner authentication function may generate an application token to authenticate the partner client application running on the browser. Separate functionality may authenticate the user. However, this scheme offers no association between the authenticated partner client application and the authenticated user. As such, if the application token is compromised, security to the partner server application may be jeopardized.

Further, there is no strong hint to trace the compromised token back to the authenticated user responsible for the token. This could result in resetting the whole partner server application, even for innocent users of such. Further, because there is no mechanism for associating a user and a partner application, a compromised user could claim an unverifiable association with any partner application. The result is that our partner-enabled web service would not be able to trust the service requests from our partners.

A delegated authentication function may set up a session allowing the browser client to act on behalf of the authenticated user. While this scheme provides a strong association between the partner client application and the authenticated user, this scheme prohibits the partner application from sharing the user's authenticated session. As such, the partner application's authentication to the web service may be disjoint from other applications capable of sharing the same authentication system, such as Windows Live enabled applications.

In one embodiment, a partner client application running on a web browser may access a partner-enabled web service. In such an embodiment, the partner client application may be authenticated and associated with the authenticated user. In this manner, the authenticated user may be enabled to access the partner-enabled web service via a partner application running on a web browser.

FIG. 1 is a block diagram of a system 100 for securing a partner-enabled web service in accordance with the claimed subject matter. The system 100 includes a partner application client 102, a partner application web service 104, and a partner-enabled web service 106, in communication over a network 108. For clarity, the partner application web service 104 is referred to herein as the partner application 104.

The client 102 may be a web browser that enables a user to create an authenticated session on the partner application 104. The partner-enabled web service 106 may be a secured web server application that provides access to common applications such as email, chat, and partner applications. Additionally, the partner-enabled web service 106 may secure its data service by serving only users that are associated with the partner application 104.

The partner application 104 and the partner-enabled web service 106 may have a trusted relationship that enables them to share a server side secret. In one embodiment, the partner-enabled web service 106 may be accessed using a representational state transfer application program interface (REST API).

Further, both the partner application 104 and the partner-enabled web service 106 share a set of proprietary authentication utilities. Using these utilities, both the partner-enabled web service 106 and the partner application 104 may be able to retrieve a user id from the authenticated session.

The partner application 104 may also include a centralized authorization engine that holds a list of users who can use the client 102 to access the partner application 104. Advantageously, maintaining a centralized list of authorized users for a given application is easy to manage.

The authorization engine may issue a client application association token (CAAT) that is carried to the client 102. The client 102 may then pass both the user authenticated session and the CAAT to the partner-enabled web service 106. The authentication engine may then verify that the CAAT is generated by the partner application 104 for the specified user. If any of the above steps fails, the authentication may fail, and the user may be denied access to the partner-enabled web service 106.

In this manner, an association may be maintained between an authenticated user and the authenticated partner application 104. Additionally, the partner application 104 may share a session with the partner-enabled web service 106. The authenticated user may be any user that can authenticate using the set of proprietary authentication utilities.

Figure 2:
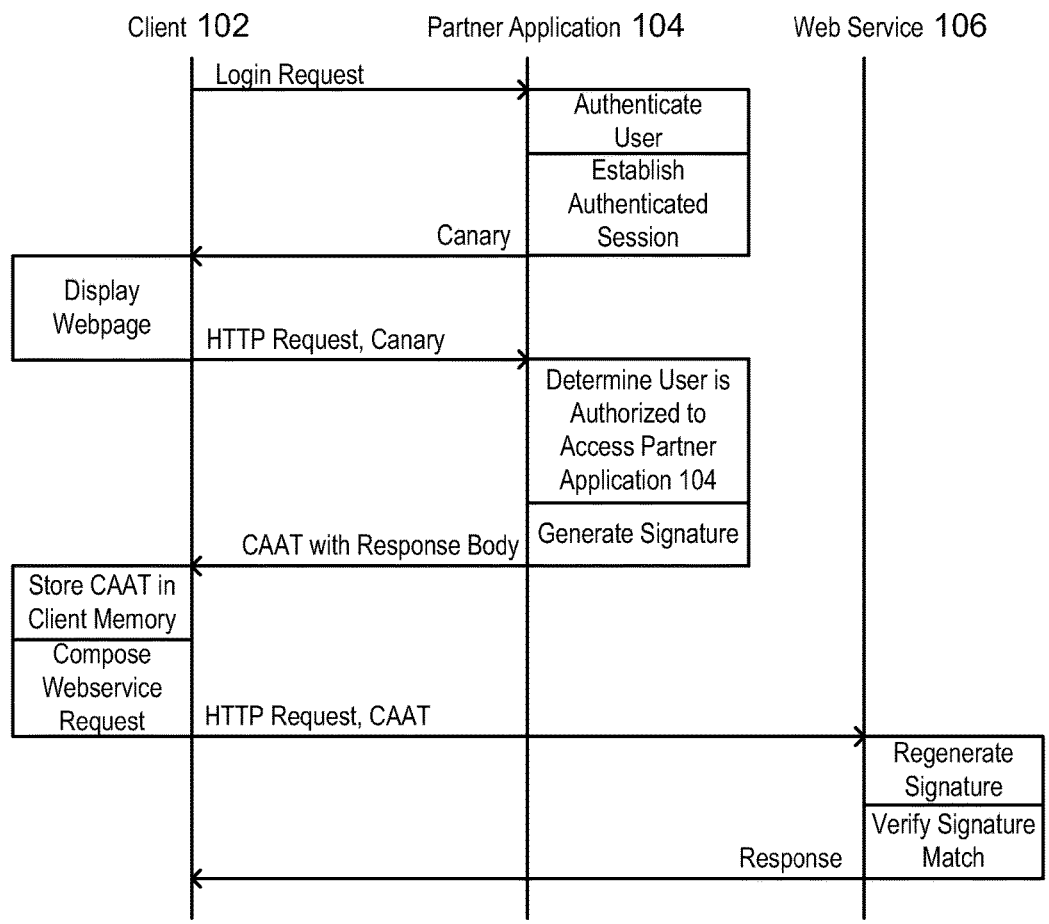
FIG. 2 is a message flow diagram of a method for securing a partner-enabled web service in accordance with the claimed subject matter.

FIG. 2 is a message flow diagram of a method 200 for securing a partner-enabled web service in accordance with the claimed subject matter. The method 200 begins when the client 102 sends a login request to the partner application 104. The partner application 104, by means of the set of proprietary authentication utilities, may then authenticate the user and establish an authenticated session.

The partner application 104 may send a response to the client 102 that includes a canary value. As understood by one skilled in the art, the canary value may be used to guard against security issues like a replay attack, and cross-site request forgery.

The client 102 may send an http request that includes the canary value. The http request may be for access to the partner application 104.

In response, the partner application 104 may determine whether the user is authorized to access the partner application 104.

If the user is authorized for both, the partner application 104 may generate a signature. The signature may include an application secret, the user id, and an application id for the partner application 104. The application secret may be a key shared by the partner application 104 and the partner-enabled web service 106, and used for signing the signature.

The partner application 104 may retrieve the user id from the authenticated session, which may be represented as cookies. On the receiving end of the partner application 104, the cookie may represent the logged-in user. The cookies are transported to the partner application 104 in a web service request to the partner application 104 (not shown).

In one embodiment, the time within which the partner-enabled web service 106 is accessible to the partner application 104 may be limited. In such an embodiment, the signature may also include a time at which the signature is generated.

The signature may be included within the CAAT, along with the application ID and time of issue. In one embodiment, the signature may be encoded using a hashing algorithm, such as a keyed-hash message authentication code such as HMAC-SHA1.

The application ID may enable the partner-enabled web service 106 to know which partner application 104 has generated the CAAT. The partner-enabled web service 106 may use the application secret specific to the application ID to verify the CAAT. The time of issue may be used to guard against replay attacks, so that the CAAT cannot be reused indefinitely.

The CAAT may be sent within the body of a response to the client 102. The client 102 may store the CAAT in client memory. Advantageously, by encoding the CAAT using a one-way hashing algorithm, no server side secrets may be readily exposed on the client 102.

The client 102 may then compose a web service request for the partner-enabled web service 106. In one embodiment, the web service request may be a REST request. The REST request may include the CAAT in the request header. The client 102 may then send an http request that includes the request header and cookies to the partner-enabled web service 106.

The partner-enabled web service 106 may then regenerate the signature. The signature may be regenerated using the component parts: the user id, the application ID, the time of issue, and the application secret.

The partner-enabled web service 106 may retrieve the user id from the authenticated session. The application ID and the time of issue may be retrieved from the CAAT included in the request header.

Both the partner application 104 and the partner-enabled web service 106 may own a copy of the application secret. As such, the partner-enabled web service 106 may use the application ID to determine which application secret to use.

The partner-enabled web service 106 may then regenerate the signature and verify that the regenerated signature matches the signature included in the CAAT of the request header. If they match, the partner-enabled web service 106 may process the request, and send a response to the client 102. If not, the partner-enabled web service 106 may send an error message.

As stated previously, the time within which a signature may be used may be limited. In one embodiment, the partner may calculate an expiration time that is eight hours passed the issue time. If the current time is past the expiration time, the request may be rejected with an error message.

Advantageously, using this method, the CAAT passed to the client 102 is associated with a user id. As such, any breach of usage agreement (with regard to a specific CAAT) may be linked to a specific user. Because the CAAT is associating a user with the partner application 104, the partner-enabled web service 106 may trust the origin of the request as a valid referral from a partner application 104.

Figure 3:
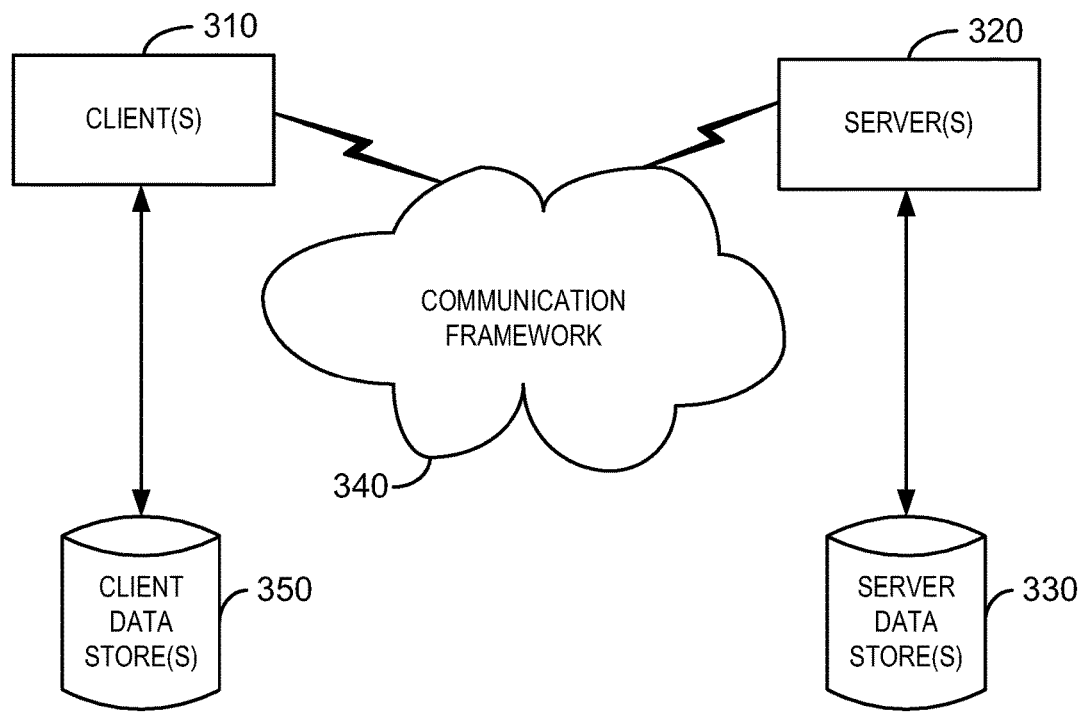
FIG. 3 is a block diagram of an exemplary networking environment wherein aspects of the claimed subject matter can be employed.

FIG. 3 is a block diagram of an exemplary networking environment 300 wherein aspects of the claimed subject matter can be employed. Moreover, the exemplary networking environment 300 may be used to implement a system and method of providing browser access to partner-enabled applications of a web service. The networking environment 300 includes one or more client(s) 310. The client(s) 310 can be hardware and/or software (e.g., threads, processes, computing devices). The environment 300 also includes one or more server(s) 320. The server(s) 320 can be hardware and/or software (e.g., threads, processes, computing devices). The servers 320 can house threads to automatically test the performance of advertising campaigns by employing the subject innovation, for example.

One possible communication between a client 310 and a server 320 can be in the form of a data packet adapted to be transmitted between two or more computer processes. The environment 300 includes a communication framework 340 that can be employed to facilitate communications between the client(s) 310 and the server(s) 320. The client(s) 310 are operably connected to one or more client data store(s) 350 that can be employed to store information local to the client(s) 310. The client data store(s) 350 do not have to be in the client(s) 310, but may be located remotely, such as in a cloud server. Similarly, the server(s) 320 are operably connected to one or more server data store(s) 330 that can be employed to store information local to the servers 320.

As an example, the client(s) 310 may be computers providing access to servers over a communication framework 340, such as the Internet. The server(s) 320 may be web service servers accessed by the client 102.

Figure 4:
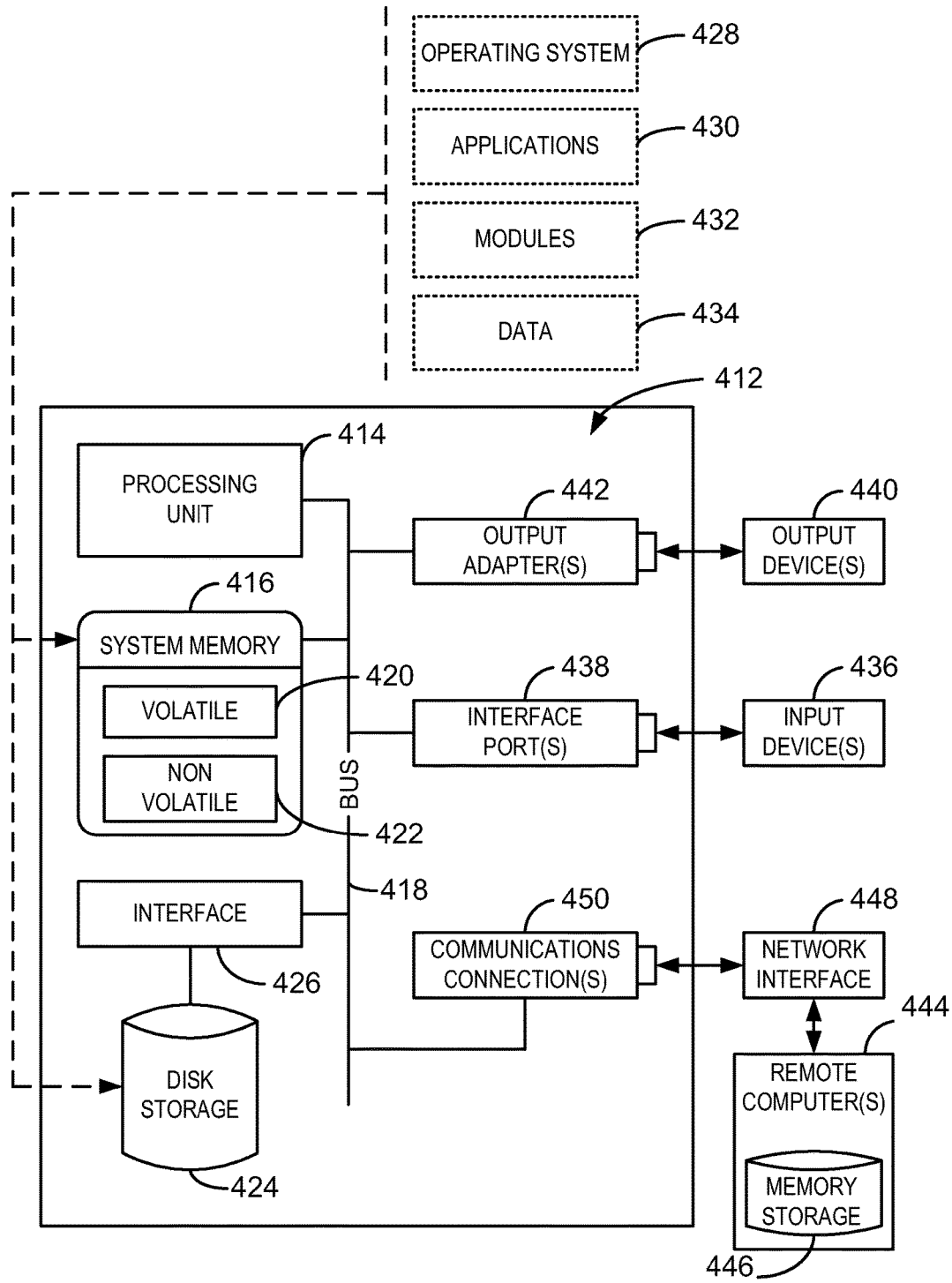
FIG. 4 is a block diagram of an exemplary operating environment that can be employed in accordance with the claimed subject matter.

With reference to FIG. 4, an exemplary operating environment 400 for implementing various aspects of the claimed subject matter includes a computer 412. The computer 412 includes a processing unit 414, a system memory 416, and a system bus 418.

The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures known to those of ordinary skill in the art.

The system memory 416 is non-transitory computer-readable media that includes volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), or flash memory.

Volatile memory 420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 412 also includes other non-transitory computer-readable media, such as removable/non-removable, volatile/non-volatile computer storage media. FIG. 4 shows, for example a disk storage 424. Disk storage 424 includes, but is not limited to, devices like a magnetic disk drive, floppy disk drive, tape drive, Jaz drive, Zip drive, LS-100 drive, flash memory card, or memory stick.

In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in the suitable operating environment 400. Such software includes an operating system 428. Operating system 428, which can be stored on disk storage 424, acts to control and allocate resources of the computer system 412.

System applications 430 take advantage of the management of resources by operating system 428 through program modules 432 and program data 434 stored either in system memory 416 or on disk storage 424. It is to be appreciated that the claimed subject matter can be implemented with various operating systems or combinations of operating systems.

A user enters commands or information into the computer 412 through input device(s) 436. Input devices 436 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 436 connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port may be used to provide input to the computer 412, and to output information from computer 412 to an output device 440.

Output adapter 442 is provided to illustrate that there are some output devices 440 like monitors, speakers, and printers, among other output devices 440, which are accessible via adapters. The output adapters 442 include, by way of illustration and not limitation, video and sound cards that provide a means of connection between the output device 440 and the system bus 418. It can be noted that other devices and/or systems of devices provide both input and output capabilities such as remote computer(s) 444.

The computer 412 can be a server hosting a partner-enabled web service in a networked environment using logical connections to one or more remote computers, such as remote computer(s) 444. The remote computer(s) 444 may be client systems configured with web browsers, PC applications, mobile phone applications, and the like, to allow users to access the advertising network, as discussed herein. The remote computer(s) 444 can be a personal computer, a server, a router, a network PC, a workstation, a microprocessor based appliance, a mobile phone, a peer device or other common network node and the like, and typically includes many or all of the elements described relative to the computer 412.

For purposes of brevity, only a memory storage device 446 is illustrated with remote computer(s) 444. Remote computer(s) 444 is logically connected to the computer 412 through a network interface 448 and then physically connected via a communication connection 450.

Network interface 448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to the computer 412. The hardware/software for connection to the network interface 448 may include, for exemplary purposes only, internal and external technologies such as, mobile phone switches, modems including regular telephone grade modems, cable modems and DSL modems, ISDN adapters, and Ethernet cards.

An exemplary embodiment of the computer 412 may comprise a server hosting a partner-enabled web service. The server may be configured to secure access to partner applications as described herein. An exemplary processing unit 414 for the server may be a computing cluster comprising Intel® Xeon CPUs. The disk storage 424 may comprise an enterprise data storage system, for example, holding thousands of impressions.

Exemplary embodiments of the subject innovation may associate an authenticated user with an authenticated application. The subject innovation may generate a token that includes a user id, application id, and an application secret that is encoded by a one-way hashing algorithm.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for securing a partner service, comprising:
   receiving a request, wherein the request comprises a unique value, to access the partner service, wherein the request is received from a browser client for a partner application;
   authenticating a user, the partner application generating a token that associates the user with the partner application;
   generating a signature for the token, the signature to enable the partner service to independently regenerate the signature, the token comprising an identifier for the partner application enabling the partner service to detect which partner application generates the token; and
   sending the token with the signature to the browser client.

2. The method recited in claim 1, wherein the token comprises:
   a shared secret of the partner application and the partner service;
   a user id; and
   an issue time that the token is generated.

3. The method recited in claim 1, comprising encoding the token using a one-way hashing algorithm.

4. The method recited in claim 1, comprising:
   storing the token in a memory associated with the browser client;
   generating a representational state transfer (REST) request comprising a header comprising the token; and
   sending the REST request to the partner service.

5. The method recited in claim 4, comprising determining an expiration time of the token based on the issue time.

6. The method recited in claim 5, comprising:
   determining that a current time is after the expiration time; and
   rejecting the REST request.

7. The method recited in claim 5, comprising:
   determining that a current time is before the expiration time;
   generating a second token based on the user, the application id, and the issue time;
   comparing the second token to the token; and
   processing the request based on the comparison.

8. The method recited in claim 7, wherein generating the second token comprises:
   retrieving a user id for the user from the session;
   retrieving the identifier of the partner application from the REST request;
   retrieving the time from the REST request; and
   encoding the second token using the one-way hashing algorithm, wherein the second token comprises:
   a shared secret of the partner application and the partner service;
   the user id;
   the identifier of the partner application; and
   an issue time that the token is generated.

9. A system for securing a partner service, comprising:
   a processing unit; and
   a system memory, wherein the system memory comprises code configured to direct the processing unit to:
   receive a request, wherein the request comprises a unique value to access the partner service, wherein the request is received from a browser client for a partner application, wherein the browser client is associated with a user;
   authenticate the user;
   generate a token, using the partner application, the token associating the user with the partner application, and the token comprising an identifier for the partner application enabling the partner service to identify the partner application as generating the token;
   generate a signature for the token, the signature to enable the partner service to independently regenerate the signature; and
   send the token with the signature to the browser client.

10. The system recited in claim 9, wherein the token comprises:
    a shared secret of the partner application and the partner service;
    a user id for the user; and
    an issue time that the token is generated.

11. The system recited in claim 9, comprising code configured to direct the processing unit to encode the token using a one-way hashing algorithm.

12. The system recited in claim 9, comprising code configured to direct the processing unit to:

store the token in a memory associated with the browser client;

generate a representational state transfer (REST) request comprising a header comprising the token; and send the REST request to the partner service.

13. The system recited in claim 12, comprising code configured to direct the processing unit to determine a pre-determined expiration time of the token.

14. The system recited in claim 13, comprising code configured to direct the processing unit to:

determine that a current time is before the expiration time;

generate a second token based on the user, the application id, and the issue time;

compare the second token to the token; and process the request based on the comparison.

15. The system recited in claim 14, wherein the code configured to direct the processing unit to generate the second token comprises code configured to direct the processing unit to:

retrieve a user id for the user from the session;

retrieve the identifier of the partner application from the REST request;

retrieve the time from the REST request; and encode the second token using the one-way hashing algorithm, wherein the second token comprises:

the user id;

the identifier of the partner application;

a shared secret of the partner application and the partner service; and an issue time that the token is generated.

16. One or more computer-readable storage devices, comprising code configured to direct a processing unit to:

receive a request to access a partner service, wherein the request comprises a unique value and the request is received from a browser client for a partner application, wherein the browser client is associated with a user;

authenticate the user;

generate a token that associates the user with the partner application, wherein the token comprises an identifier of the partner application enabling the partner service to identify the partner application as generating the token;

generate a signature for the token, the signature to enable the partner service to independently regenerate the signature;

send the token with the signature to the browser client; and encode the token using a one-way hashing algorithm.

17. The one or more computer-readable storage devices recited in claim 16, comprising code configured to direct the processing unit to:

store the token in a memory associated with the browser client;

generate a representational state transfer (REST) request comprising a header comprising the token; and send the REST request to the partner service.

18. The one or more computer-readable storage devices recited in claim 17, comprising code configured to direct the processing unit to:

determine that a current time is before an expiration time;

generate a second token based on the user, the application id, and the issue time;

compare the second token to the token; and process the request based on the comparison.

19. The one or more computer-readable storage devices recited in claim 18, wherein the code configured to direct the processing unit to generate the second token comprises code configured to direct the processing unit to:

retrieve the user id for the user from the session;

retrieve the identifier of the partner application from the REST request;

retrieve the time from the REST request; and encode the second token using the one-way hashing algorithm, wherein the second token comprises:

the user id;

the identifier of the partner application;

the shared secret of the partner application and the partner service; and an issue time that the token is generated.

20. The one or more computer-readable storage devices recited in claim 19, wherein the session is represented by a cookie.

* * * * *